(12) United States Patent
Roberts et al.

(10) Patent No.: US 10,180,072 B2
(45) Date of Patent: Jan. 15, 2019

(54) ADDITIVELY MANUFACTURED BLADED DISK

(71) Applicant: General Electric Company, Schenectady, NY (US)

(72) Inventors: Herbert Chidsey Roberts, Middletown, OH (US); Richard William Albrecht, Jr., Fairfield, OH (US); Michael John McCarren, South Lebanon, OH (US); Peter Andrew Flynn, Delmar, NY (US); Michael Francis Xavier Gigliotti, Jr., Glenville, NY (US); Eric Alan Estill, Morrow, OH (US)

(73) Assignee: General Electric Company, Schenectady, NY (US)

( * ) Notice: Subject to any disclaimer, the term of this patent is extended or adjusted under 35 U.S.C. 154(b) by 414 days.

(21) Appl. No.: 14/887,531

(22) Filed: Oct. 20, 2015

(65) Prior Publication Data

US 2017/0107832 A1    Apr. 20, 2017

(51) Int. Cl.
*F01D 5/30* (2006.01)
*F01D 5/06* (2006.01)
(Continued)

(52) U.S. Cl.
CPC .............. *F01D 5/30* (2013.01); *B22F 3/1055* (2013.01); *B22F 5/009* (2013.01); *B22F 5/04* (2013.01);
(Continued)

(58) Field of Classification Search
CPC ...................................................... F01D 5/028
See application file for complete search history.

(56) References Cited

U.S. PATENT DOCUMENTS

| 1,937,865 A | 12/1933 | Baker |
| 2,639,119 A * | 5/1953 | Greenwald ............... F01D 5/30 |
| | | 219/107 |

(Continued)

FOREIGN PATENT DOCUMENTS

| DE | 202 21 061 U1 | 2/2005 |
| DE | 10 2011 084 153 A1 | 4/2013 |

(Continued)

OTHER PUBLICATIONS

FR 2,631,268, Benoit et al, published Nov. 1989, machine translation.*

(Continued)

*Primary Examiner* — Ninh H Nguyen
*Assistant Examiner* — Jason Davis
(74) *Attorney, Agent, or Firm* — General Electric Company; Brian Overbeck

(57) ABSTRACT

A bladed disk for a gas turbine engine is provided. The bladed disk includes a rotor disk, a plurality of rotor blades, and an interlocking transition zone. The rotor disk includes a plurality of fused layers of a first material formed via additive manufacturing and defines an outer rim. The plurality of rotor blades includes a plurality of fused layers of a second material formed via additive manufacturing. The interlocking transition zone includes a plurality of projections alternately extending from the outer rim of the rotor disk and the plurality of rotor blades, respectively, to undetachably couple the rotor disk and the plurality of rotor blades.

5 Claims, 6 Drawing Sheets

(51) Int. Cl.

| | | |
|---|---|---|
| *F01D 5/32* | (2006.01) | |
| *F01D 5/34* | (2006.01) | |
| *B22F 7/06* | (2006.01) | |
| *B22F 3/105* | (2006.01) | |
| *B22F 5/00* | (2006.01) | |
| *B33Y 10/00* | (2015.01) | |
| *B33Y 80/00* | (2015.01) | |
| *B22F 5/04* | (2006.01) | |
| *F01D 5/02* | (2006.01) | |

(52) U.S. Cl.
CPC .............. *B22F 7/062* (2013.01); *B33Y 10/00* (2014.12); *B33Y 80/00* (2014.12); *F01D 5/02* (2013.01); *F01D 5/026* (2013.01); *F01D 5/06* (2013.01); *F01D 5/066* (2013.01); *F01D 5/3061* (2013.01); *F01D 5/32* (2013.01); *F01D 5/34* (2013.01); *F05D 2230/31* (2013.01); *Y02P 10/295* (2015.11); *Y02T 50/673* (2013.01)

(56) References Cited

U.S. PATENT DOCUMENTS

| | | | |
|---|---|---|---|
| 2,790,656 | A | 4/1957 | Cook |
| 4,175,912 | A * | 11/1979 | Crane ............... F01D 5/22 416/134 R |
| 4,966,421 | A | 10/1990 | Mengel |
| 5,172,504 | A | 12/1992 | De Maat et al. |
| 5,269,057 | A | 12/1993 | Mendhem |
| 5,626,556 | A | 5/1997 | Tobler et al. |
| 5,645,193 | A | 7/1997 | Gentile et al. |
| 5,945,193 | A | 8/1999 | Pollard et al. |
| 6,471,800 | B2 | 10/2002 | Jang et al. |
| 6,521,331 | B1 | 2/2003 | Sikorski et al. |
| 6,905,100 | B2 | 6/2005 | Franck et al. |
| 7,431,976 | B2 | 10/2008 | Hermann et al. |
| 8,096,751 | B2 * | 1/2012 | Arrell ............... F01D 5/3061 415/115 |
| 8,114,242 | B2 | 2/2012 | Cai et al. |
| 9,884,393 | B2 | 2/2018 | Roberts et al. |
| 9,914,172 | B2 | 3/2018 | Roberts et al. |
| 2007/0086892 | A1 | 4/2007 | Tomko et al. |
| 2008/0182017 | A1* | 7/2008 | Singh ............... B22F 3/1055 427/142 |
| 2008/0193709 | A1 | 8/2008 | Han |
| 2009/0119919 | A1* | 5/2009 | Kington ............... B23P 15/006 29/889.7 |
| 2009/0293165 | A1 | 12/2009 | Arnold |
| 2011/0033285 | A1 | 2/2011 | Turi et al. |
| 2011/0052412 | A1 | 3/2011 | Ader et al. |
| 2013/0045093 | A1 | 2/2013 | Wunderlich et al. |
| 2013/0247614 | A1 | 9/2013 | Thomas |
| 2013/0276456 | A1 | 10/2013 | Propheter-Hinckley et al. |
| 2014/0011912 | A1 | 1/2014 | Petry et al. |
| 2014/0099476 | A1 | 4/2014 | Subramanian et al. |
| 2014/0127005 | A1 | 5/2014 | Schreiber |
| 2014/0255198 | A1 | 9/2014 | El-Wardany et al. |
| 2014/0308539 | A1 | 10/2014 | Witz et al. |
| 2015/0021379 | A1 | 1/2015 | Albrecht et al. |
| 2015/0224607 | A1 | 8/2015 | Bruck et al. |
| 2015/0337667 | A1* | 11/2015 | Slavens ............... F01D 5/18 416/1 |

FOREIGN PATENT DOCUMENTS

| | | | |
|---|---|---|---|
| EP | 1445426 | A2 | 8/2004 |
| EP | 2204547 | A1 | 7/2010 |
| EP | 2 719 484 | A1 | 4/2014 |
| EP | 2 777 867 | A1 | 9/2014 |
| EP | 2 815 823 | A1 | 12/2014 |
| EP | 3 050 651 | A1 | 8/2016 |
| FR | 2631268 | A1 * | 11/1989 ............ B23K 33/00 |
| JP | H06-108801 | A | 4/1994 |
| JP | 2013-217220 | A | 10/2013 |
| WO | 2009157817 | A1 | 12/2009 |
| WO | 2014/052323 | A1 | 4/2014 |
| WO | 2014/092919 | A1 | 6/2014 |
| WO | 2014158284 | A2 | 10/2014 |
| WO | WO 2015047485 | A2 * | 4/2015 ........... F01D 5/3007 |

OTHER PUBLICATIONS

European Search Report and Opinion issued in connection with related EP Application No. 16194274.3 dated Feb. 16, 2017.
GE Related Case Form.
U.S. Appl. No. 14/887,459, filed Oct. 20, 2015, Roberts, et al.
U.S. Appl. No. 14/887,481, filed Oct. 20, 2015, Roberts, et al.
U.S. Appl. No. 14/887,509, filed Oct. 20, 2015, Roberts, et al.
U.S. Appl. No. 14/887,556, filed Oct. 20, 2015, Roberts, et al.
U.S. Appl. No. 14/887,481, filed Oct. 20, 2015, Herbert Chidsey Roberts et al.
U.S. Appl. No. 14/887,509, filed Oct. 20, 2015, Herbert Chidsey Roberts et al.
U.S. Appl. No. 14/887,459, filed Oct. 20, 2015, Herbert Chidsey Roberts et al.
U.S. Appl. No. 14/887,556, filed Oct. 20, 2015, Herbert Chidsey Roberts et al.
Extended European Search Report and Opinion issued in connection with related EP Application No. 16194267.7 dated Mar. 30, 2017.
Extended European Search Report and Opinion issued in connection with related EP Application No. 16194269.3 dated Mar. 30, 2017.
Extended European Search Report and Opinion issued in connection with corresponding EP Application No. 16194270.1 dated Mar. 30, 2017.
Extended European Search Report and Opinion issued in connection with related EP Application No. 16194271.9 dated Apr. 4, 2017.
Non-Final Rejection towards related U.S. Appl. No. 14/887,481 dated Jul. 13, 2017.
Office Action issued in connection with corresponding CA Application No. 2945104 dated Jul. 25, 2017.
Office Action issued in connection with related CA Application No. 2945233 dated Jul. 27, 2017.
Non-Final Rejection towards U.S. Appl. No. 14/887,459 dated Aug. 3, 2017.
Notification of Reasons for Refusal issued in connection with corresponding JP Application No. 2016-199625 dated Nov. 14, 2017.

* cited by examiner

ADDITIVELY MANUFACTURED BLADED DISK

FIELD OF THE INVENTION

The present subject matter generally relates to additive manufacturing methods of joining two components along an interlocking transition zone.

BACKGROUND OF THE INVENTION

In manufacturing, it is often desirable to join two or more components to create a single part. However, current methods of joining components, whether these components are made from the same or dissimilar materials, often result in poor mechanical properties.

For example, prior art methods of joining two components may include metal-melting processes such as welding or brazing, using mechanical fasteners such as rivets or screws, or applying and curing a structural adhesive. These joints can exhibit poor physical properties and provide a weak mechanical bond, such as poor shear bonding or adhesion. These joints may also be prone to crack initiation and propagation along the material transition line or plane due to concentrated stresses in those regions.

In addition, in some applications, it is desirable to have a joint that allows some relative movement between joined components. For example, a joint between two or more components that is not pliant or flexible may exhibit issues related to fatigue durability, impact resistance, and overall lifetime of the joint. In cases where the components or joining material have different coefficients of thermal expansion, a joint that allows no relative movement cannot compensate for thermal growth mismatch, thus leading to failure of the joint in certain temperature environments.

Additionally, cooling holes that extend between joined components may be desirable. However, depending on the orientation and configuration of the joint and components, it may not be possible to form cooling holes using current methods, such as drilling or machining, without compromising the integrity of the joint. It may not be possible to create a cooling hole, for example, where the hole is internal to the joint itself or where drilling a hole might otherwise weaken the joint.

Accordingly, a method of joining two or more components with improved structural integrity is desirable. More particularly, a method for forming a joint that allows for relative movement between components or the inclusion of cooling holes if desired, while still providing a strong mechanical bond would be particularly useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a bladed disk for a gas turbine engine is provided. The bladed disk includes a rotor disk, a plurality of rotor blades, and an interlocking transition zone. The rotor disk includes a plurality of fused layers of a first material formed via additive manufacturing and defines an outer rim. The plurality of rotor blades includes a plurality of fused layers of a second material formed via additive manufacturing. The interlocking transition zone includes a plurality of projections alternately extending from the outer rim of the rotor disk and the plurality of rotor blades, respectively, to undetachably couple the rotor disk and the plurality of rotor blades.

In still another embodiment of the present disclosure, a method of forming a bladed disk using additive manufacturing is provided. The method includes fusing a plurality of layers of a first material via additive manufacturing to form a rotor disk that defines an outer rim. The method also includes fusing a plurality of layers of a second material via additive manufacturing to form a plurality of rotor blades. In addition, the method includes undetachably coupling the rotor disk and the plurality of rotor blades by forming an interlocking transition zone including a plurality of projections alternately extending from the rotor disk and the plurality of rotor blades, respectively.

In yet another embodiment of the present disclosure, a rotor blade is provided. The rotor blade includes a dovetail extending from a platform, the dovetail and the platform including a plurality of fused layers of a first material formed via additive manufacturing. The rotor blade also includes an airfoil including a plurality of fused layers of a second material formed via additive manufacturing. An interlocking transition zone includes a plurality of projections alternately extending from the platform and the airfoil, respectively, to undetachably couple the platform and the airfoil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
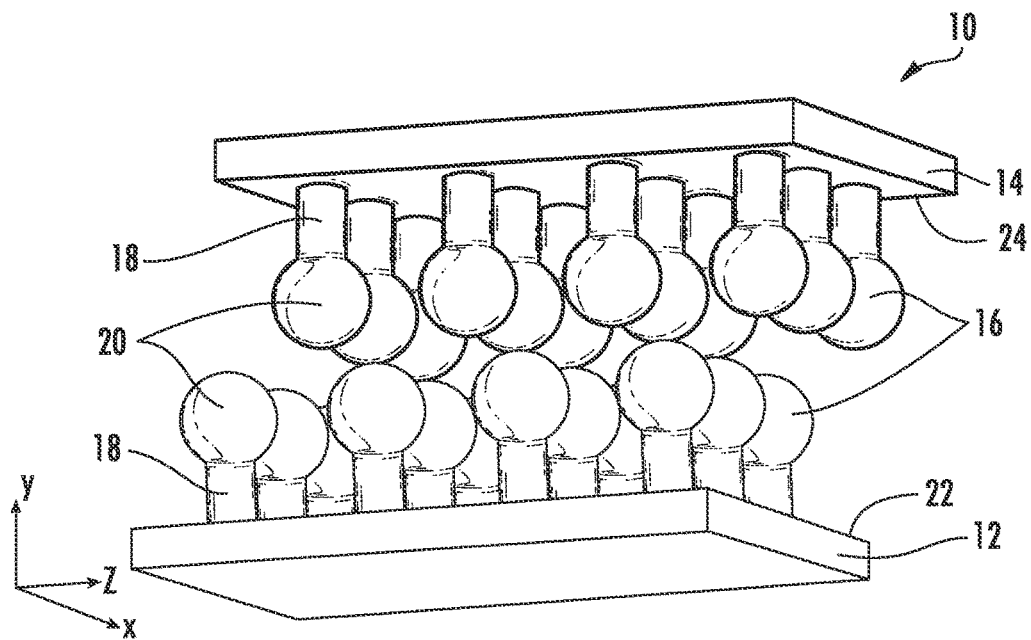
FIG. 1 is a perspective view of an interlocking transition zone in accordance with an example embodiment of the present disclosure, where the first and second components are shown separated to provide a clear view of the projections.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Additive manufacturing technology enables fabrication of complex objects by building objects point-by-point, layer-by-layer, typically in a vertical (Y) direction. Although the discussion below refers to the addition of material, one skilled in the art will appreciate that the methods and structures disclosed herein may be practiced with any additive manufacturing technique or technology. For example, embodiments of the present invention may use layer-additive processes, layer-subtractive processes, or hybrid processes. In some embodiments, the method and structure disclosed herein may provide two or more components joined by an interlocking transition zone 10 and formed by successively depositing layers of one or more materials.

Embodiments of the present disclosure provide methods and structures for joining two or more components using additive manufacturing technology. In this regard, multiple components may be created that are independent entities, but that are created with interlocking features in their construction to effectively form mechanical "roots" that reach across a bonding region, thereby resisting disassembly and carrying structural loading across the transition zone. The resulting joints may be planar or non-planar and may exhibit improved mechanical strength and adhesion. The interlocking material transition zone can also be used, for example, to secure a highly impact resistant protective coating layer to a base material. In addition, the interlocking features may be spaced apart to permit a small range of motion between the components, and the joints may have integrated cooling holes or passageways.

Referring now to the figures, FIG. 1 shows a perspective view of an interlocking transition zone 10 in accordance with an example embodiment of the present disclosure, where a first component 12 and a second component 14 are shown separated to provide a clear view of a plurality of projections 16. As shown, the interlocking transition zone 10 may extend in the in a planar region defined by the X-Z plane. Notably, only the interlocking transition zone 10 is shown in the figures, but one skilled in the art will appreciate that the first component 12 and second component 14 can be any simple or complex object manufactured using additive manufacturing technology. In addition, the first component 12 and second component 14, and the interlocking transition zone 10 connecting them, can be scaled to any size. For example, each projection 16 might range from several nanometers in cross-section to several centimeters or larger. Given its versatility and scalability, the presently disclosed method and structure for joining two or more components using additive manufacturing technology can be practiced in various applications and fields of technology.

Figure 2:
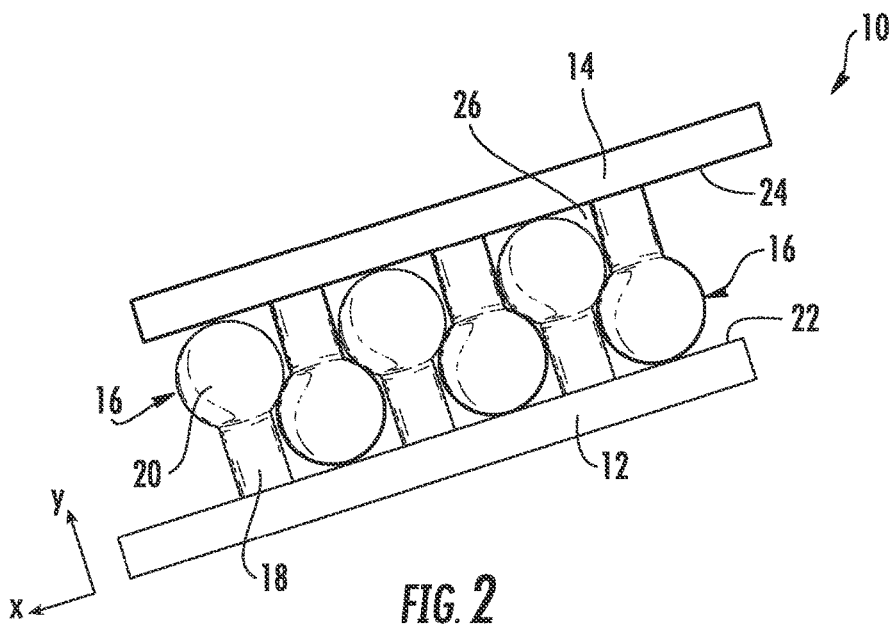
FIG. 2 is a side view of an interlocking transition zone with shaft and knob projections according to an example embodiment.

FIG. 2 is a side view of an interlocking transition zone 10 with shaft 18 and knob 20 projections 16 according to one exemplary embodiment. As shown, each of the first component 12 and second component 14 comprises a plurality of projections 16 extending from a first component surface 22 and a second component surface 24, respectively. Although the illustrated embodiment shows each projection 16 extending in a substantially perpendicular direction, one skilled in the art will appreciate that in other embodiments, each projection 16 may be fabricated at any angle with respect to the component surfaces 22, 24. Each projection 16 comprises a shaft 18 with a knob 20 located at its distal end. In the embodiments illustrated in FIGS. 1 and 2, the shaft 18 is cylindrical and the knob 20 is spherical. However, in some embodiments, the shaft 18 may instead have a cross-section that is square, rectangular, elliptical, irregularly shaped, or any other suitable shape, and may be at common or at different lengths. Similarly, the knob 20 may be square, oblong, or any other suitable shape.

The plurality of projections 16 may alternately extend from the first component 12 and the second component 14 to form an interlocking transition zone 10 extending in both the longitudinal (X) and lateral (Z) direction. In some embodiments, the diameter of knob 20 is larger than the diameter of shaft 18, and the shafts 18 are spaced along the first component 12 and second component 14 such that the knob 20 may fit between adjacent shafts 18. In this manner, the plurality of projections 16 form an interlocking transition zone 10 that mechanically couples the first component 12 and the second component 14. Because the interlocking transition zone 10 may be printed layer-by-layer using additive manufacturing, the resulting interlocking transition zone 10 undetachably couples the first component 12 and the second component 14. In this regard, the first component 12 and the second component 14 are joined such that they may not be separated through non-destructive means. In some embodiments, at least a portion of adjacent projections 16 may prevent relative motion between the components 12, 14. As explained in more detail below, in other embodiments the spacing of the shafts 18 may be adjusted to allow for relative movement of the plurality of projections 16 and provide some flexibility to the interlocking transition zone 10.

Figure 3:
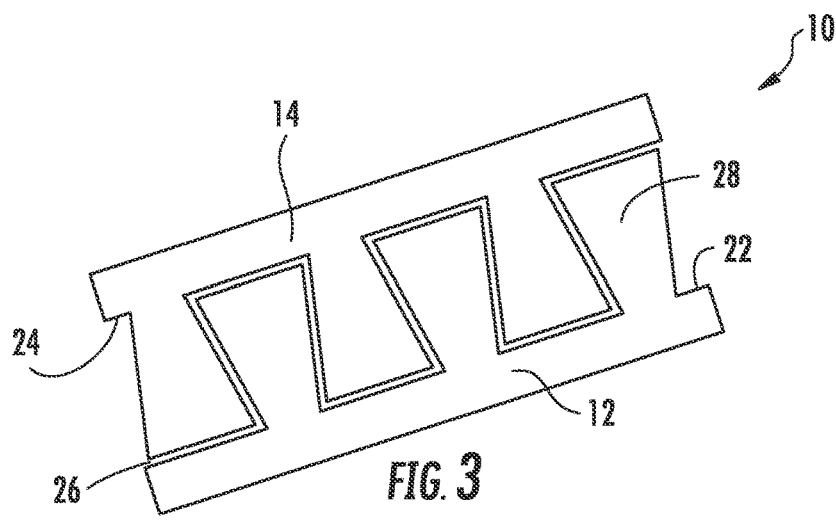
FIG. 3 is a side view of an interlocking transition zone with trapezoidal projections according to an example embodiment.

In some example embodiments, the projections 16 can have a different shape. In this regard, the plurality of projections 16 may be irregularly shaped, and each projection 16 may either fill the entire area between adjacent projections 16, or may leave gaps or small interstices 26. For example, as shown in FIG. 3, the projections 16 may be trapezoidal projections 28. In this regard, each trapezoidal projection 28 has a narrow cross-section proximate to the first component 12 or second component 14, respectively. The cross-sectional area of the trapezoidal projection 28 gets larger as the trapezoidal projection 28 extends away from the first component 12 or second component 14 toward a distal end of the trapezoidal projection 28, where the cross-section is the largest.

Figure 4:
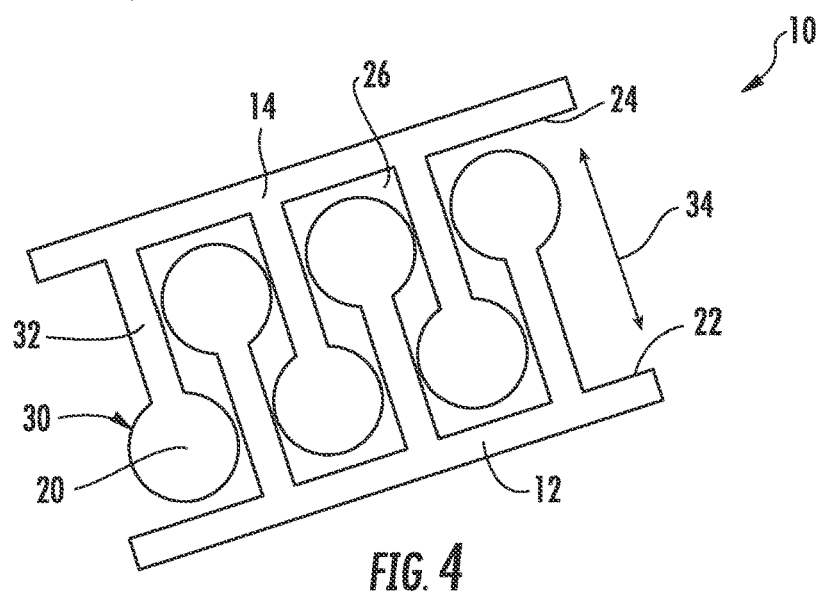
FIG. 4 is a side view of an interlocking transition zone with elongated shaft and knob projections according to an example embodiment.

Referring now specifically to the embodiment of FIG. 4, the plurality of projections 16 may be elongated projections 30. In this regard, the elongated projections 30 may have elongated shafts 32, or may be otherwise fabricated to allow some relative motion between the first component 12 and the second component 14. For example, the elongated shafts 32 may allow the first component 12 and second component 14 to slide relative to each other in the Z-direction (as indicated by arrow 34) until the adjacent knobs 20 come into contact with each other. Similarly, in some embodiments, the spacing of the plurality of projections 16 may be increased so as to permit a small range of motion in the X, Y, and Z planes and rotations about the X, Y, and Z axis. As one skilled in the art will appreciate, the size, shape, and spacing of the plurality of projections 16 may be adjusted to permit or restrict motion as needed for any particular application.

Figure 5:
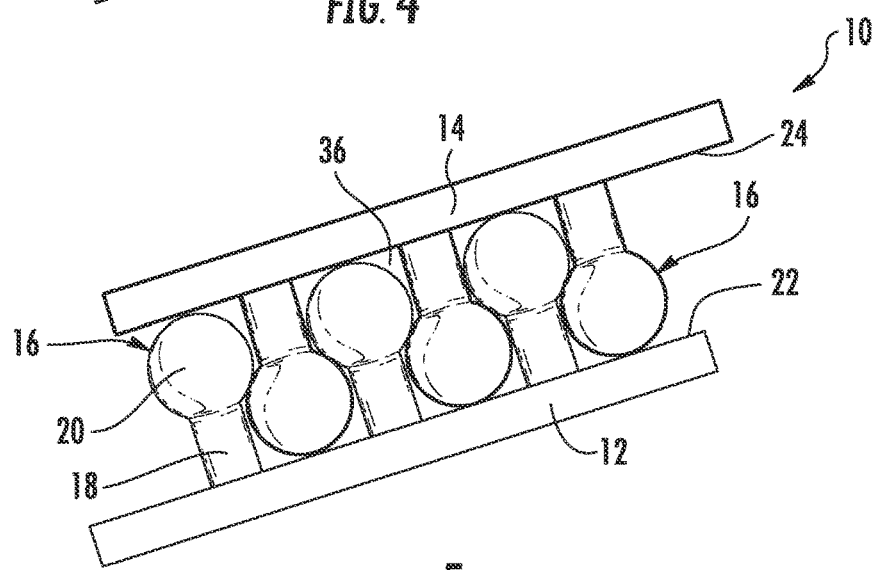
FIG. 5 is a side view of an interlocking transition zone with shaft and knob projections, where a braze material is used as an adhesive between the first and second component according to an example embodiment.

Now referring specifically to FIG. 5, some embodiments of the interlocking transition zone 10 may have an adhesive 36 or other material disposed between the first component surface 22 and the second component surface 24 in order to further ensure a strong bond. This adhesive layer 36 may be, for example, an epoxy or cured resin, or the joint may be made by introduced a brazing filler material between the first component 12 and second component 14. Alternatively, the adhesive layer 36 may be another additively manufactured layer between the first component 12 and the second component 14, and may be made from any material suitable for use in an additive manufacturing process, as discussed below. In this manner, the adhesive layer 36 may improve the mechanical bond strength of the interlocking transition zone 10.

Figure 6:
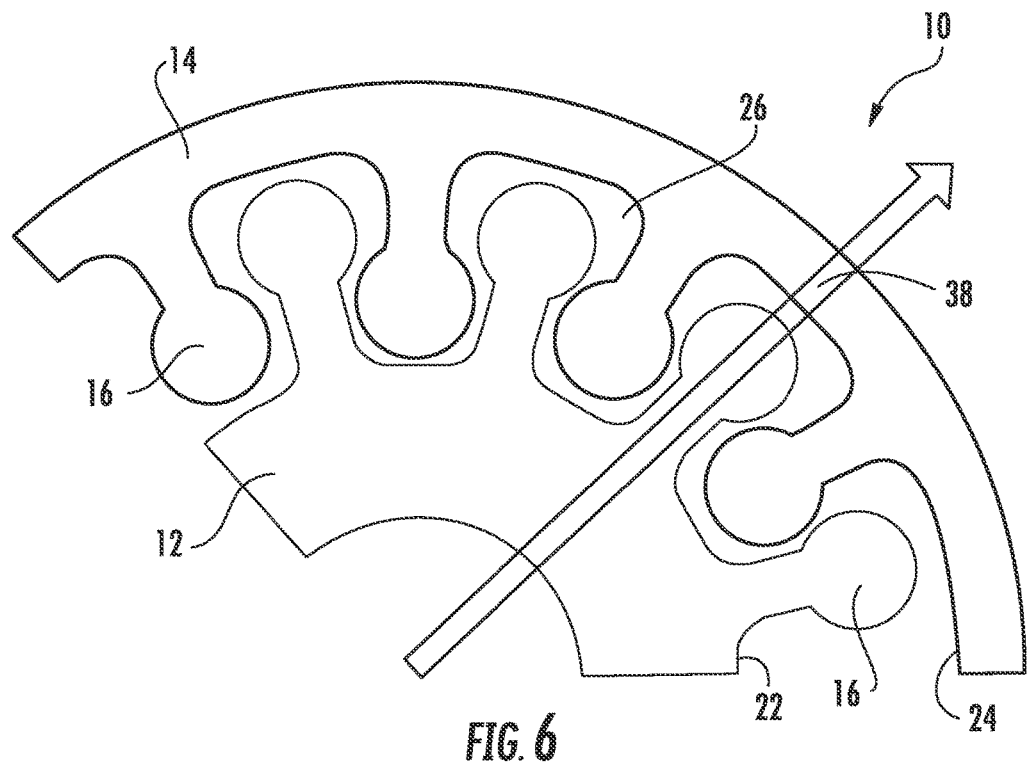
FIG. 6 is a side view of a non-planar interlocking transition zone with a cooling hole extending through according to an example embodiment.
Figure 7:
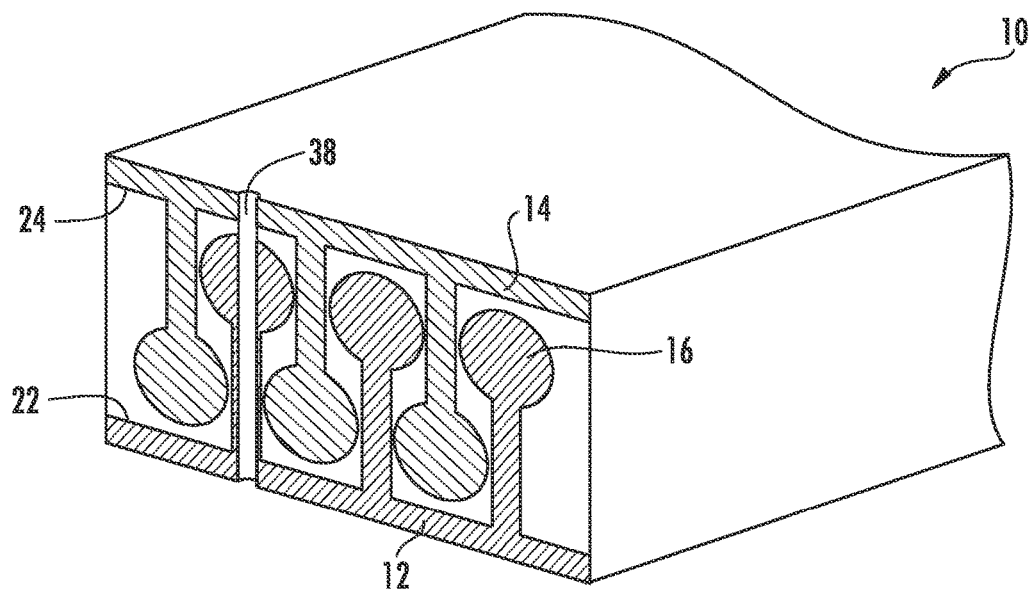
FIG. 7 is a perspective cross-sectional view of an interlocking transition zone with a cooling hole extending through according to an example embodiment.

In some cases, it is desirable to include cooling holes 38 that extend through the interlocking transition zone 10 to provide for communication of cooling fluid between the first component 12 and second component 14 and/or within the interlocking transition zone 10. FIG. 6 shows a side view of a non-planar interlocking transition zone 10 with an integrated cooling hole 38. FIG. 7 is a perspective cross-sectional view of an interlocking transition zone 10 with an integrated cooling hole 38. In these exemplary embodiments, the cooling holes 38 may be formed through the components by selectively depositing material during the additive manufacturing process to form the passageway or cooling hole 38. The cooling holes 38 may extend internally through an interlocking transition zone 10, such that they are self-contained and not exposed to any exterior surface of the joined components. In addition, the cooling holes 38 may be of any shape or size, and may be placed in any location. For example, although the cooling holes 38 depicted in FIGS. 6 and 7 are linear and extend straight through the interlocking transition zone 10 from the first component 12 to the second component 14, the cooling holes 38 may instead be curved or serpentine.

The additive manufacturing process disclosed herein enables the first component 12 and second component 14 to be made of any of a variety of materials. Each component may be made of the same material or of a different material. In fact, even a single component may comprise multiple layers of different materials. In some embodiments, the first component 12 may be a first part and the second component 14 may be a second part, such that the interlocking transition zone 10 creates a multi-part assembly. Moreover, one skilled in the art will appreciate that the method and structure described herein need not be limited to two components, but may be used to join more than two components. In some embodiments, the first component 12 may be a base material and the second component 14 may be a protective coating. For example, the second component 14 may be a thermal barrier coating or a bond coat of thermal barrier coating to provide improved thermal durability to the first component 12. In other embodiments, the protective coating may be a very durable material exhibiting high impact resistance. In this manner, the protective coating may protect the underlying component from impact damage and extend its lifetime.

As indicated above, the second component 14 may be a protective coating, such as a thermal barrier coating (TBC) system or an environmental barrier coating (EBC) system. Such TBC and EBC systems may generally include a bond layer covering the outer surface of the first component 12 and a thermal barrier layer disposed over the bond layer. As is generally understood, the bond layer may be formed from an oxidation resistant metallic material designed to inhibit oxidation and/or corrosion of the underlying first component 12. For instance, in several embodiments, the bond layer may be formed from a material comprising "MCrAlY," where "M" represents iron, nickel or cobalt, or from an aluminide or noble metal aluminide material (e.g., platinum aluminide). Similarly, the thermal barrier layer may be formed from a temperature resistant material in order to increase the operating temperature capability of the first component 12. For example, in several embodiments, the thermal barrier layer may be formed from various known ceramic materials, such as zirconia partially or fully stabilized by yttrium oxide, magnesium oxide or other noble metal oxides.

Moreover by using the methods and structures disclosed above to create an interlocking transition zone 10, the bond layer of the TBC and EBC systems may be eliminated altogether. In this regard, the bond layer is typically used in TBC and EBC systems in order to provide an intermediate layer between the first component 12 and the thermal barrier coating to compensate for thermal mismatching—i.e., the first component 12 and thermal barrier coating may have different coefficients of thermal expansion, causing stresses as the materials grow at different rates when placed in high temperature environments. The bond layer provides additional mechanical strength and adhesion to ensure the thermal mismatching does not result in bonding region failure. However, as discussed above, the plurality of projections 16 form an interlocking transition zone 10 that provides a strong mechanical bond and improved adhesion between components. Therefore, if an interlocking transition zone 10 couples a protective thermal barrier coating to the first component 12, the bond layer may be eliminated altogether and the assembly can still withstand high temperature environments.

In addition, one skilled in the art will appreciate that a variety of materials and methods for bonding those materials may be used and are contemplated as within the scope of the present disclosure. For example, the material may be plastic, metal, concrete, ceramic, polymer, epoxy, photopolymer resin, or any other suitable material that may be in solid, liquid, powder, sheet material, or any other suitable form. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting process. One skilled in the art will appreciate other methods of fusing materials to make a component by additive manufacturing are possible, and the presently disclosed subject matter may be practiced with those methods.

In some embodiments, the first material and the second material have different coefficients of thermal expansion. In such embodiments, it may be desirable to configure the plurality of projections 16 to allow some relative movement, thereby reducing the likelihood of failure due to concentrated stresses resulting from thermal growth mismatch.

Additive manufacturing technology enables the creation of multiple components that are independent entities, but that are created with interlocking features in their construction to limit their range of motion and/or disassembly. In this regard, two or more independent components can be fabricated with interlocking features that effectively form mechanical "roots" that reach across a interlocking transition zone 10, resist disassembly, and have the capacity to carry structural loading across the interlocking transition zone 10. The ability to effectively join two or more components using additive manufacturing technology introduces a wide range of planar or non-planar joints, and can enable the creation of unique assemblies.

The interlocking material transition zone 10 can provide technical and commercial advantages over the prior art. Joints created using the described method have improved mechanical strength, exhibiting improved shear bonding between regions of different function, composition, or microstructures, and enhanced adhesion at the micro or macro scale. The interlocking material transition zone 10 can also be used, for example, to secure a highly impact resistant protective coating layer to a base material. Bond layer versatility is also improved in that the components may be made of the same or dissimilar material, and the joints may be planar or non-planar. In addition, the interlocking features may be spaced apart to permit a small range of motion between the components, and the joints may have integrated cooling holes or passageways.

The above-described apparatus and method of joining two or more components using additive manufacturing can be used in a variety of applications and in a variety of industries. For example, components of a gas turbine engine may be constructed using this process. A few examples of components of a gas turbine engine that may be constructed using the above described method are discussed below. However, as one skilled in the art will appreciate, these components are only exemplary, and other applications and uses of the described additive manufacturing technology are possible and within the scope of the invention.

Figure 8:
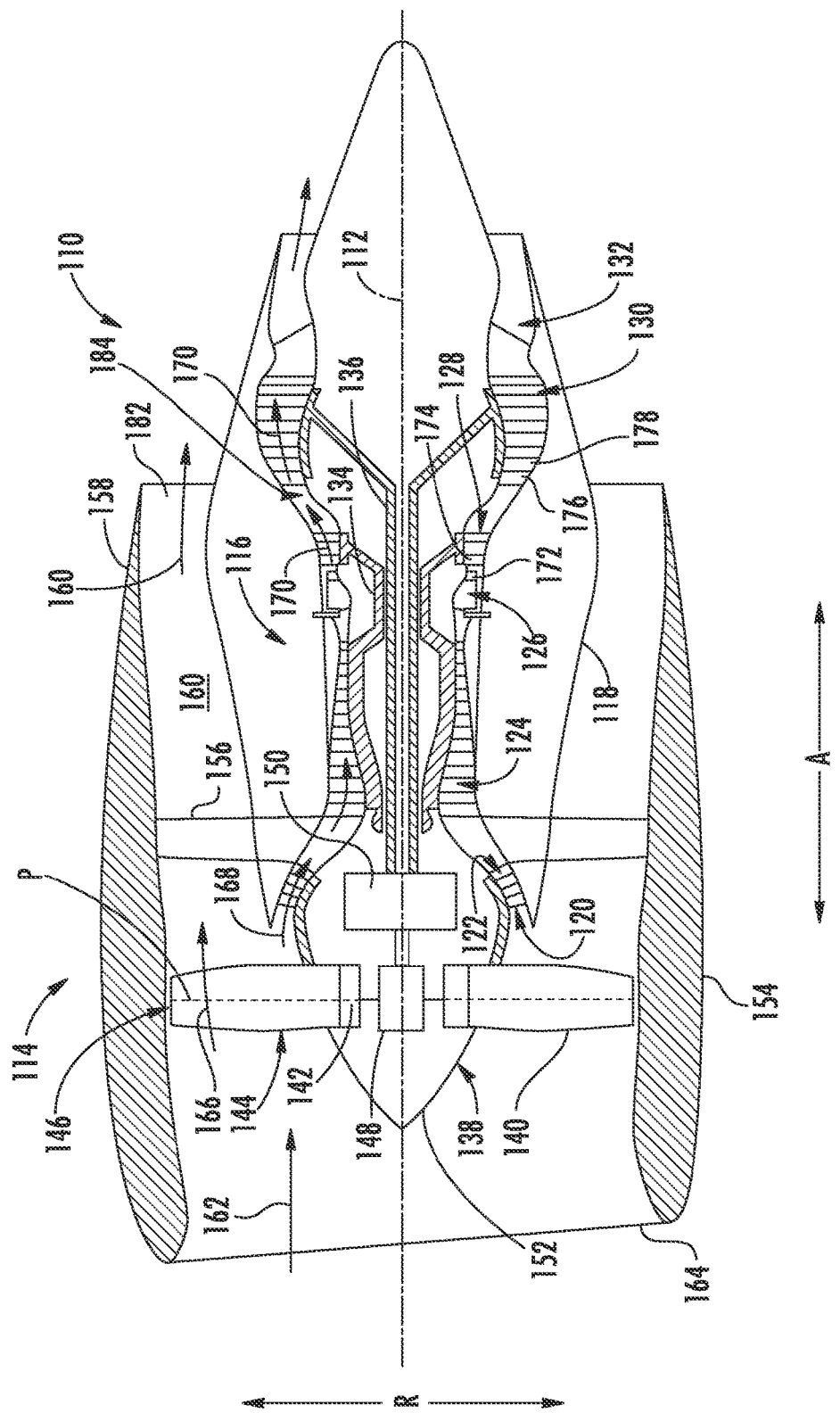
FIG. 8 is a schematic cross-sectional view of a gas turbine engine according to an exemplary embodiment of the present subject matter.

FIG. 8 is a schematic cross-sectional view of a gas turbine engine according to an exemplary embodiment of the present subject matter. More particularly, for the embodiment of FIG. 8, the gas turbine engine is a high-bypass turbofan jet engine 110, referred to herein as "turbofan engine 110." As shown in FIG. 8, the turbofan engine 110 defines an axial direction A (extending parallel to a longitudinal centerline 112 provided for reference) and a radial direction R. In general, the turbofan 110 includes a fan section 114 and a core turbine engine 116 disposed downstream from the fan section 114.

The exemplary core turbine engine 116 depicted generally includes a substantially tubular outer casing 118 that defines an annular inlet 120. The outer casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects the HP turbine 128 to the HP compressor 124. A low pressure (LP) shaft or spool 136 drivingly connects the LP turbine 130 to the LP compressor 122.

Additionally, for the embodiment depicted, the fan section 114 includes a variable pitch fan 138 having a plurality of fan blades 140 coupled to a disk 142 in a spaced apart manner. As depicted, the fan blades 140 extend outwardly from disk 142 generally along the radial direction R. Each of the plurality of fan blades 140 defines a leading edge 144, or upstream edge, and a tip 146 defined at a radially outer edge of each respective fan blade 140. Each fan blade 140 is also rotatable relative to the disk 142 about a pitch axis P by virtue of the fan blades 140 being operatively coupled to a suitable actuation assembly 148 configured to vary the pitch of the fan blades 140 in a manner described in detail below. The fan blades 140, disk 142, and actuation assembly 148 are together rotatable about the longitudinal axis 112 by LP shaft 136 across a power gear box 150. The power gear box 150 includes a plurality of gears for stepping down the rotational speed of the LP shaft 136 to a more efficient rotational fan speed. Additionally, for the embodiment depicted, the disk 142 of the variable pitch fan 138 is covered by rotatable front hub 152 aerodynamically contoured to promote an airflow through the plurality of fan blades 140.

Referring still to the exemplary turbofan engine 110 of FIG. 8, the exemplary fan section 114 additionally includes an annular fan casing or outer nacelle 154 that circumferentially surrounds the fan 138 and/or at least a portion of the core turbine engine 116. It should be appreciated that the nacelle 154 may be configured to be supported relative to the core turbine engine 116 by a plurality of circumferentially-spaced outlet guide vanes 156. Moreover, a downstream section 158 of the nacelle 154 may extend over an outer portion of the core turbine engine 116 so as to define a bypass airflow passage 160 therebetween.

During operation of the turbofan engine 110, a volume of air 162 enters the turbofan 110 through an associated inlet 164 of the nacelle 154 and/or fan section 114. As the volume of air 162 passes across the fan blades 140, a first portion of the air as indicated by arrows 166 is directed or routed into the bypass airflow passage 160 and a second portion of the air as indicated by arrow 168 is directed or routed into the LP compressor 122. The ratio between the first portion of air 166 and the second portion of air 168 is commonly known as a bypass ratio. The pressure of the second portion of air 168 is then increased as it is routed through the high pressure (HP) compressor 124 and into the combustion section 126, where it is mixed with fuel and burned to provide combustion gases 170.

The combustion gases 170 are routed through the HP turbine 128 where a portion of thermal and/or kinetic energy from the combustion gases 170 is extracted via sequential stages of HP turbine stator vanes 172 that are coupled to the outer casing 118 and HP turbine rotor blades 174 that are coupled to the HP shaft or spool 134, thus causing the HP shaft or spool 134 to rotate, thereby supporting operation of the HP compressor 124. The combustion gases 170 are then routed through the LP turbine 130 where a second portion of thermal and kinetic energy is extracted from the combustion gases 170 via sequential stages of LP turbine stator vanes 176 that are coupled to the outer casing 118 and LP turbine rotor blades 178 that are coupled to the LP shaft or spool 136, thus causing the LP shaft or spool 136 to rotate, thereby supporting operation of the LP compressor 122 and/or rotation of the fan 138.

The combustion gases 170 are subsequently routed through a jet exhaust nozzle section 182 of the core turbine engine 116 to provide propulsive thrust. Simultaneously, the pressure of the first portion of air 166 is substantially increased as the first portion of air 166 is routed through the bypass airflow passage 160 before it is exhausted from a fan nozzle exhaust section 182 of the turbofan 110 also providing propulsive thrust. The HP turbine 128, the LP turbine 130, and the jet exhaust nozzle section 132 at least partially define a hot gas path 184 for routing the combustion gases 170 through the core turbine engine 116.

The above-described additive manufacturing technology enables fabrication of complex objects by joining two or more components by an interlocking transition zone 10. This technology may be advantageously employed to manufacture a variety of components in turbofan 110. For example, as discussed below, the additive manufacturing technology can be used to construct a variety of bladed disks 200 and rotor blades 202. These components may be made from one or more materials and may exhibit improved structural integrity. In addition, these components may include performance enhancing features such as protective coatings, flexible joints providing a small range of motion, and joints having integrated cooling holes or passageways. One skilled in the art will appreciate that the below-described embodiments are only examples of components that may be fabricated using the above-described additive manufacturing process, and that other similarly constructed components are within the scope of the invention.

Referring generally to FIGS. 9 through 12, example embodiments of bladed disk 200 are presented in accordance with the present subject matter. The invention will be discussed in reference to bladed disk 200, which those skilled in the art will appreciate may be a high or low pressure turbine or compressor disk of gas turbine engine 110. In addition, one skilled in the art will appreciate that the teachings and benefits of this invention are also applicable to other components of gas turbine engine 110. The bladed disk 200 may be one unitary and integrally formed part (e.g., FIGS. 9 and 10) or the bladed disk 200 may be formed from multiple components that are joined together to create a multi-part assembly (e.g., FIGS. 11 and 12).

Figure 9:
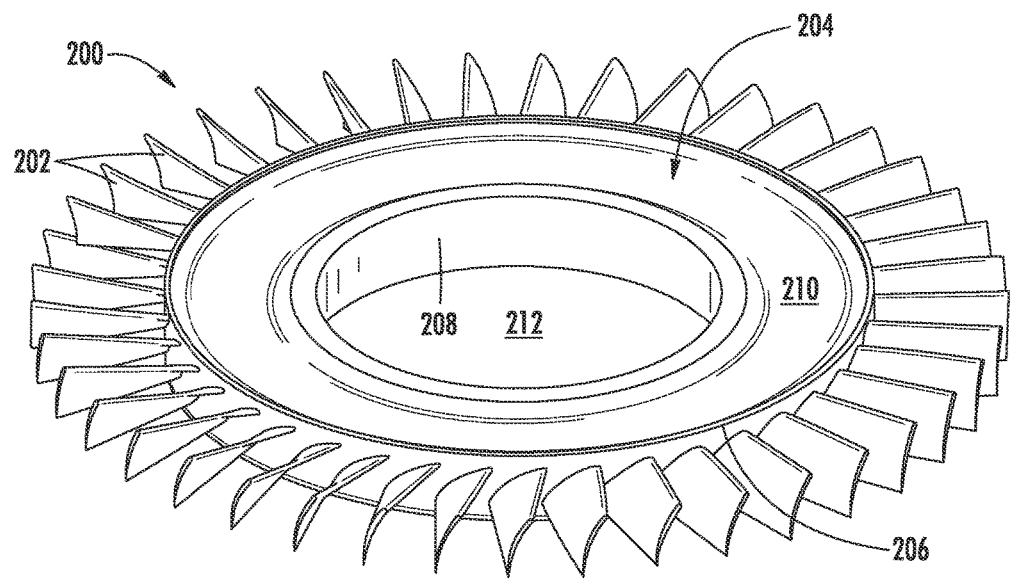
FIG. 9 is a perspective view of an exemplary bladed disk of a type used in gas turbine engines according to an embodiment of the invention.
Figure 10:
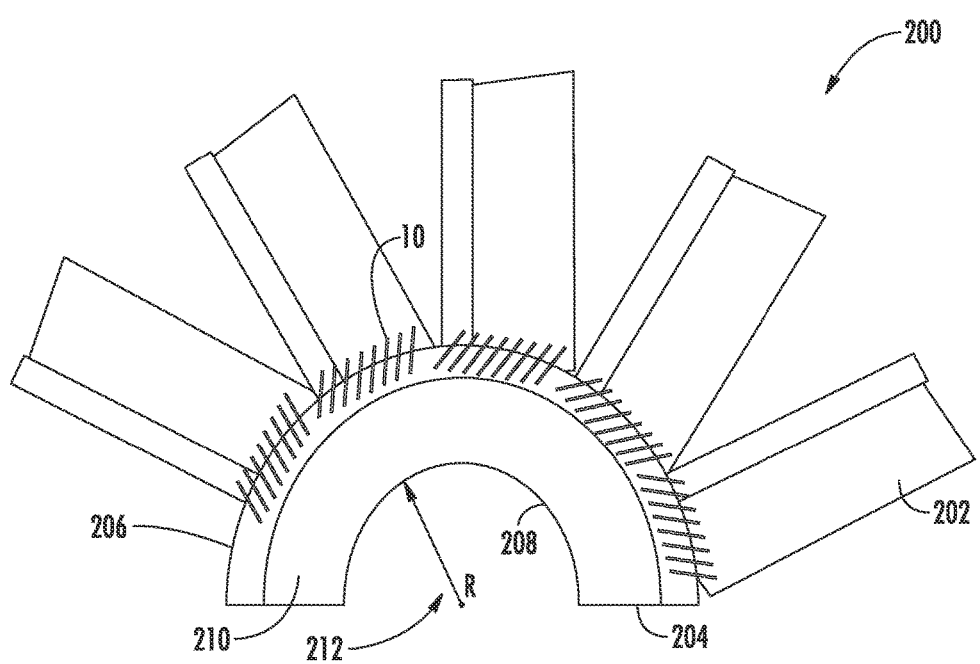
FIG. 10 is a top view of the exemplary bladed disk of FIG. 9 and illustrates how each blade may be integrally formed with the rotor disk according to an embodiment of the invention.

Referring to FIGS. 9 and 10, the bladed disk 200 generally includes a rotor disk 204 having an outer rim 206, a central hub or bore 208, and a web 210 between the outer rim 206 and bore 208. A plurality of integrally-formed rotor blades 202 extend radially from the outer rim 206. A bore hole 212 in the form of a through-hole is centrally located in the bore 208 for mounting the bladed disk 200 on a shaft, and therefore the axis of the bore hole 212 coincides with the axis of rotation of the bladed disk 200. As shown, each rotor blade 202 is integrally formed with, and extends in a radial direction R from, an outer rim 206 of the rotor disk 204. This bladed disk 200 may sometimes be referred to in the art as an integrally bladed rotor (IBR) or a "BLISK."

Notably, the bladed disk 200 may be formed using the additive manufacturing technologies described above. For example, the bladed disk 200 may be additively manufactured by successively depositing layer upon layer of material starting at a central hub or bore 208 of the rotor disk 204 and depositing material outwardly in a radial direction R to the outer rim 206 of the rotor disk 204. Each rotor blade 202 may then be additively manufactured, starting with an interlocking transition zone 10, formed using the method described above, and extending radially from outer rim 206 of rotor disk 204. As described in general above, the interlocking transition zone 10 is an integral joint between the rotor disk 204 and the rotor blade 202 including a plurality of projections extending alternately from the outer rim 206 of the rotor disk 204 and the plurality of rotor blades 202. In this manner, the rotor blades 202 are integrally formed and undetachably coupled with the rotor disk 204 and exhibit a strong mechanical bond without the need for welding, brazing, or other attachment means. In addition, a bladed disk 200 formed in this manner reduces or eliminates the need for additional machining and other post-processing techniques.

Using the above described manufacturing process, the rotor disk 204 and the rotor blades 202 may each be made of one or more different materials. Alternatively, the rotor disk 204 and rotor blades 202 may all be formed from the same material. For example, the rotor disk 204 may be formed from a first metal alloy and the rotor blades 202 may be formed from a second metal alloy.

In addition, by using additive manufacturing according to the present subject matter, the resulting interlocking transition zone 10 may be planar or non-planar, the interlocking features may be spaced apart to permit a small range of motion between the components, and the joints may have integrated cooling holes or passageways. For example, the interlocking transition zone 10 may define a plurality of fluid channels that provide fluid communication between the rotor disk 204 and the rotor blades 202. In this manner, for example, cooling fluid may be supplied through a central hub or bore 208 of the rotor disk 204 and may flow through the rotor disk 204, through the interlocking transition zone 10, and into the rotor blades 202. The fluid channels may be straight, serpentine, or any other shape suitable for cooling the rotor disk 204 and/or rotor blades 202.

Figure 11:
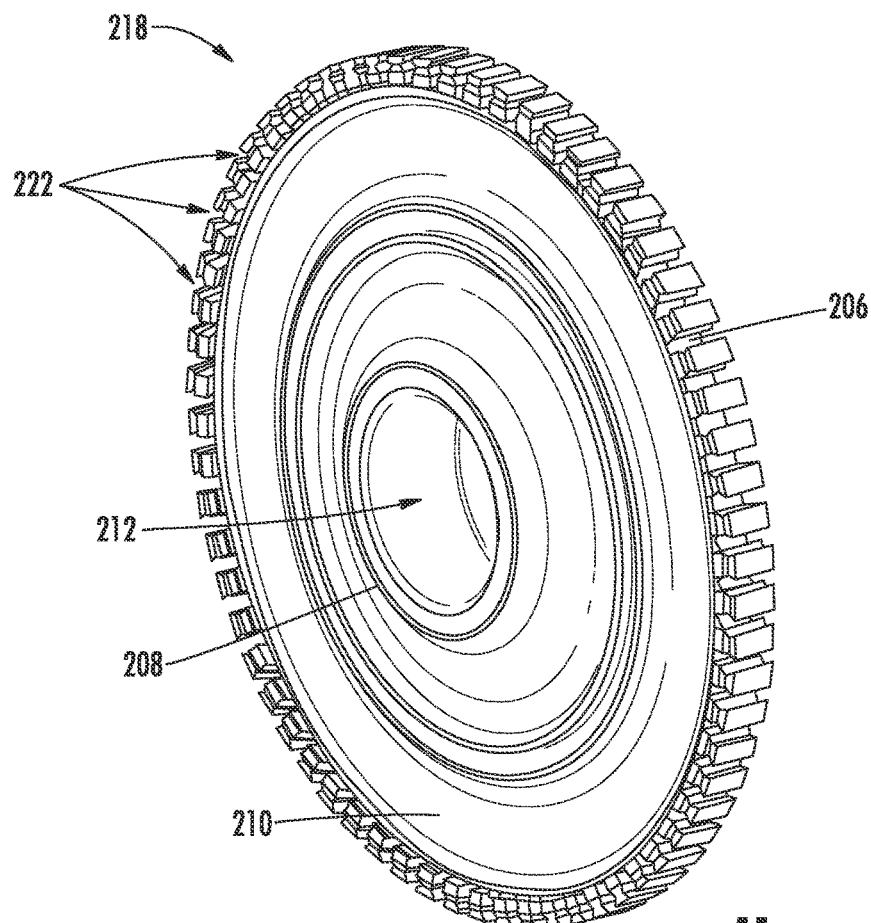
FIG. 11 is a perspective view of an exemplary rotor disk to which a plurality of rotor blades may be attached to form a multi-component bladed disk according to an embodiment of the invention.
Figure 12:
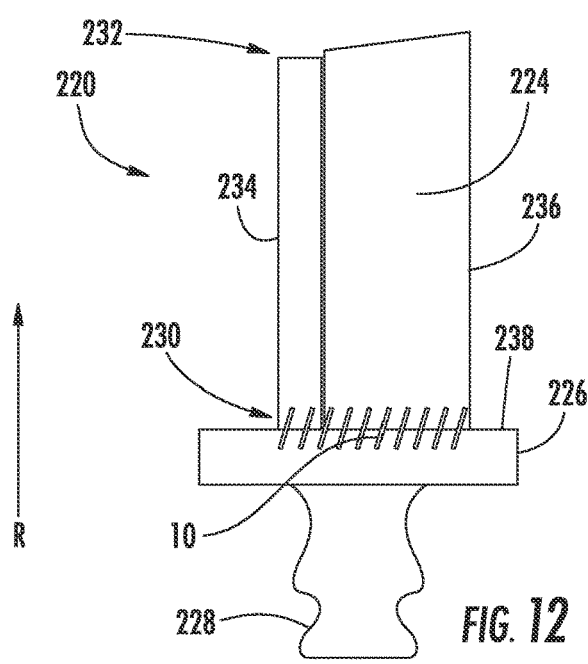
FIG. 12 is a top view of a single rotor blade which may be attached to the exemplary rotor disk of FIG. 11 to form a multi-component bladed disk according to an embodiment of the invention.

Referring now to FIGS. 11 and 12, the bladed disk 200 may alternatively be formed by a rotor disk 218 (FIG. 11) including a plurality of separate rotor blades 220 (FIG. 12). In this regard, the outer rim 206 of the rotor disk 218 may be configured for the attachment of rotor blades 220 (e.g., turbine or compressor blades) by defining a plurality of receiving slots or recesses 222 configured for receiving each rotor blade 220.

Referring specifically to FIG. 12, each rotor blade 220 may comprise an airfoil 224, a platform 226, and an integral dovetail 228 used for mounting airfoil 224 to a rotor disk 218 in a known manner. The airfoil 224 may extend in a radial direction R between a root end 230 located proximate to platform 226 and a tip end 232 at a distal end of the airfoil 224. Each airfoil 224 includes a first contoured side wall and a second contoured side wall. The first side wall is convex and defines a suction side of airfoil 224, and the second side wall is concave and defines a pressure side of airfoil 224. The side walls are joined at a leading edge 234 and at an axially-spaced trailing edge 236 of airfoil 224. More specifically, airfoil trailing edge 236 is spaced chordwise and downstream from airfoil leading edge 234. First and second side walls extend radially outward in span from blade root 230 positioned adjacent dovetail 228, to an airfoil tip end 232.

In this exemplary embodiment, the interlocking transition zone 10 may be additively manufactured on an outer surface 238 of the platform 226 and the root 230 of the airfoil 224. Similar to the exemplary embodiment described of FIGS. 9 and 10, rotor disk 218 and rotor blade 220 may be formed of multiple materials and may incorporate features such as flexible joints and/or integral cooling channels. For example, in one embodiment, the plurality of projections 16 in the interlocking transition zone 10 do not permit relative movement between the platform 226 and the airfoil 224. In another embodiment, the plurality of projections 16 may be elongated projections 30. In this regard, the elongated projections 30 may have elongated shafts 32, or may be otherwise fabricated to allow some relative motion between the platform 226 and the airfoil 224. In addition, the interlocking transition zone 10 may include fluid cooling channels providing fluid communication between the platform 226 and the airfoil 224. Each of the plurality of rotor blades may attach to the rotor disk 218 by inserting dovetail 228 in one of the plurality of recesses or slots 222. In this manner, a multi-component bladed disk 200 may be manufactured using the above-described technologies.

In addition, the interlocking transition zone 10 may include variations in the geometry of projections 16 to implement variations in damping or stiffness between two or more bodies—e.g., first component 12 and second component 14, rotor disk 204 and the plurality of rotor blades 202, or platform 226 and airfoil 224. For example, the size and/or length of shaft 18 and knob 20 may be configured to vary the physical interaction between the two bodies which can include, but is not limited to, bending stiffness, axial stiffness, and including natural frequencies.

The above-described example embodiments of additively manufactured bladed disks 200 formed using an interlocking transition zone 10 are intended only as exemplary embodiments used for the purpose of explanation. The embodiments shown are turbine or compressor bladed disks, but one skilled in the art will appreciate that the teachings and benefits of this invention are also applicable to other components of gas turbine engine 110. The above-described additive manufacturing technology enables the formation of a bladed disk 200 from one or more pieces and from one or more materials. In addition, bladed disk 200 may incorporate many other features made possible by the additive manufacturing technology, such as flexible joints or cooling fluid channels. These embodiments are not in any way intended to limit the scope of the invention. Indeed, one skilled in the art will appreciate that many other components of gas turbine engine 110 may be constructed using the additive manufacturing technology as described throughout the specification and in the appended figures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. A bladed disk for a gas turbine engine, comprising:
    a rotor disk comprising a plurality of fused layers of a first material formed via additive manufacturing, wherein the rotor disk defines an outer rim;
    a plurality of rotor blades comprising a plurality of fused layers of a second material formed via additive manufacturing; and
    an interlocking transition zone comprising a plurality of projections alternately extending from the outer rim of the rotor disk and the plurality of rotor blades, respectively, to undetachably couple the rotor disk and the plurality of rotor blades, wherein each of the plurality of projections allows for variations in the relative motion between the rotor disk and the plurality of rotor blades.

2. The bladed disk of claim 1, wherein at least a portion of adjacent projections between the rotor disk and the plurality of rotor blades prevents or limits the relative motion between the rotor disk and the plurality of rotor blades.

3. The bladed disk of claim 1, wherein the interlocking transition zone defines a fluid channel, the fluid channel being configured to provide fluid communication between the rotor disk and the plurality of rotor blades.

4. The bladed disk of claim 1, wherein the first material is a first metal alloy and the second material is a second metal alloy.

5. The bladed disk of claim 1, wherein a brazed joint is located between the rotor disk and the plurality of rotor blades to act as adhesive.

* * * * *